United States Patent
Schindler

(10) Patent No.: US 10,246,149 B2
(45) Date of Patent: Apr. 2, 2019

(54) WHEEL SUSPENSION FOR A TWO-TRACK VEHICLE

(71) Applicant: AUDI AG, Ingolstadt (DE)

(72) Inventor: Sebastian Schindler, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 56 days.

(21) Appl. No.: 15/703,234

(22) Filed: Sep. 13, 2017

(65) Prior Publication Data

US 2018/0072357 A1  Mar. 15, 2018

(30) Foreign Application Priority Data

Sep. 15, 2016 (DE) .................. 10 2016 217 698

(51) Int. Cl.
- *B60G 17/02* (2006.01)
- *B62D 55/12* (2006.01)
- *B60G 21/055* (2006.01)
- *B62D 55/108* (2006.01)

(52) U.S. Cl.
CPC ....... *B62D 55/1083* (2013.01); *B60G 17/025* (2013.01); *B60G 21/055* (2013.01); *B62D 55/12* (2013.01); *B60G 2202/134* (2013.01); *B60G 2202/135* (2013.01); *B60G 2202/42* (2013.01); *B60G 2206/427* (2013.01)

(58) Field of Classification Search
None
See application file for complete search history.

(56) References Cited

U.S. PATENT DOCUMENTS

| | | | | |
|---|---|---|---|---|
| 3,085,817 A | * | 4/1963 | Krause | B60G 21/0556 192/85.14 |
| 3,778,082 A | * | 12/1973 | Grosseau | B60G 11/60 280/124.13 |
| 4,234,205 A | * | 11/1980 | Thiesce | B60G 11/183 280/124.107 |
| 4,491,342 A | * | 1/1985 | Aubry | B60G 3/145 267/154 |
| 9,694,645 B2 | * | 7/2017 | Schmitt | B60G 11/60 |

(Continued)

FOREIGN PATENT DOCUMENTS

| | | | | |
|---|---|---|---|---|
| DE | 8703322 U1 | | 5/1987 | |
| DE | 10233499 A1 | * | 1/2004 | ......... B60G 21/0553 |

(Continued)

OTHER PUBLICATIONS

Examination Report dated Jul. 27, 2017 of corresponding German application No. 102016217698.6; 12 pgs.

*Primary Examiner* — Drew J Brown
(74) *Attorney, Agent, or Firm* — Maier & Maier, PLLC

(57) ABSTRACT

A wheel suspension for a two-track vehicle having at least one stabilizer formed as a stabilizer torsion spring rod, with the stabilizer extending in the vehicle's transverse direction and having a drive lever on at least one vehicle side, which acts upon a wheel guidance element of the wheel suspension, and having at least one suspension spring, which is tensioned with a spring preload between the vehicle body and a wheel guidance element of the wheel suspension. The suspension spring is at least partially formed as a suspension spring/torsion spring rod. The suspension spring/torsion spring rod is arranged radially within the stabilizer torsion spring rod designed as a hollow rod.

14 Claims, 6 Drawing Sheets

(56) References Cited

U.S. PATENT DOCUMENTS

| | | | | |
|---|---|---|---|---|
| 2002/0190486 A1* | 12/2002 | Phillis | ................ | B60G 17/0152 |
| | | | | 280/6.157 |
| 2003/0071516 A1* | 4/2003 | Biard | .................... | B60G 11/60 |
| | | | | 301/127 |
| 2004/0102567 A1* | 5/2004 | Pennequin | ............. | B60G 11/60 |
| | | | | 524/502 |
| 2012/0299265 A1* | 11/2012 | King | ........................ | B60G 3/20 |
| | | | | 280/124.136 |
| 2013/0127131 A1* | 5/2013 | Michel | ................. | B60G 11/183 |
| | | | | 280/124.106 |
| 2014/0232083 A1* | 8/2014 | Mohrlock | ............ | B60G 17/025 |
| | | | | 280/124.166 |
| 2015/0165862 A1* | 6/2015 | Schindler | ............. | B60G 17/025 |
| | | | | 280/124.109 |

FOREIGN PATENT DOCUMENTS

| | | |
|---|---|---|
| DE | 102006009524 A1 | 9/2007 |
| DE | 102009048818 A1 | 4/2011 |
| DE | 102010033002 A1 | 2/2012 |
| DE | 102013012755 A1 | 2/2015 |
| DE | 102014007844 A1 | 11/2015 |
| DE | 102014007956 A1 | 11/2015 |
| FR | 2318755 A1 | 2/1977 |
| FR | 2608518 A1 | 6/1988 |

\* cited by examiner

WHEEL SUSPENSION FOR A TWO-TRACK VEHICLE

FIELD

The invention relates to a wheel suspension for a two-track.

BACKGROUND

The wheel suspension of a two-track vehicle has, in normal practice, a stabilizer, which extends between the two sides of the vehicle without interruption in the vehicle's transverse direction and has an output lever on each side of the vehicle, which acts upon a wheel guidance element of the wheel suspension. During driving operation, tendencies of the vehicle to roll and pitch can be compensated for with the assistance of the stabilizer. In addition, a common wheel suspension has a suspension spring, with which the mass of the vehicle body is resiliently supported, for example, on a wheel guidance element of the wheel suspension. The suspension spring, which is usually implemented as a helical compression spring, forms a spring-damper unit of the vehicle, together with a shock absorber, which damps the compression and rebound movements of the wheel suspension during driving operation.

DE 10 2006 009 524 A1 discloses a generic wheel suspension, with which the stabilizer has a stabilizer torsion spring rod, which can be impacted with a torsional moment by means of a rotational damper or generally by means of an actuator. Using actuators, a torque can be generated, which counteracts a twisting movement of the torsion rod (or of the torsion spring rod). The stabilizer torsion spring rod is mounted on body-side stabilizer bearings so as to pivot, these bearings being implemented by means of the rotational dampers. In addition, the wheel suspension known from DE 10 2006 009 524 A1 has suspension springs, which are each executed as helical compression springs and are positioned in the wheel suspension independently of the position of the stabilizer torsion spring rod.

In general, such damper elements are known, for example, from DE 10 2009 048 818 A1, from DE 10 2014 007 956 A1, or from DE 10 2014 007 844 A1.

With such type of wheel suspension, the available packaging space for the chassis components installed therein, that is, the suspension spring, for example, is greatly limited.

SUMMARY

The object of the invention is to provide a wheel suspension for a two-track vehicle, in which an available packaging space is optimally utilized in the wheel suspension.

Departing from the above prior art, the suspension spring, is no longer installed in the wheel suspension independently of the position of the stabilizer torsion spring rod, but rather integrated into the stabilizer torsion spring rod to the benefit of the packaging space. To this end, the suspension spring is at least partially designed as a suspension spring/torsion spring rod. The suspension spring/torsion spring rod is arranged radially within the stabilizer torsion spring rod implemented as a hollow rod. In this manner, the suspension spring is positioned embedded within the stabilizer torsion spring rod.

In addition, a first and/or a second actuator, which can preferably be electronically actuated, is allocated to the suspension spring. By means of the actuator, a suspension spring foot point can be adjusted, for example for adjusting the height of the vehicle body. The suspension spring constant, that is, the suspension spring hardness/softness, can be varied by means of the second actuator. In this manner, an active wheel suspension is provided, in which the first and second actuators are provided in order to stabilize the pitch and roll and/or to adjust the height of the vehicle body and/or to increase the comfort.

In one technical implementation, the first/second actuator is radially arranged, affixed to the body, outside of the stabilizer torsion spring rod. The first actuator for adjusting the suspension spring foot point may be connected specially to the suspension spring/torsion spring rod arranged radially within the stabilizer torsion spring rod via a gear step, to be described subsequently.

With respect to a simply designed as well as trouble-free transfer of power between the actuators and the suspension spring/torsion spring rod, a power transfer path can be implemented as described below: Consequently, the external end of the suspension spring/torsion spring rod protrudes above the stabilizer torsion spring rod and is connected to an axial bar via a coupler protruding radially toward the exterior. Said axial bar extends essentially parallel to the axis with respect to the stabilizer torsion spring rod and/or with radial distance with respect to the stabilizer torsion spring rod. The first and/or the second actuator engages at the axial bar.

In a first design variant, the previously mentioned gear step can be formed as follows between the first actuator and the aforementioned axial bar: Thus, the gear speed may have a drive-side gear wheel element on a drive shaft of the first actuator and an output-side gear wheel element engaging therewith, which is mounted rotatably and coaxially with respect to the stabilizer torsion spring rod on its outer circumference and is connected to the axial bar in a torsionally-resistant manner. When the first actuator is activated, thus the axial bar can be pivoted in the stabilizer circumferential direction, whereby the suspension spring foot point is likewise moved in the circumferential direction in order, for example, to undertake a height adjustment of the vehicle body.

In a further design variant, the axial bar may be implemented as a spring element, which has additional spring properties as compared to the coupler, which is likewise integrated in the power transfer path. In this manner, the effective spring length of the suspension spring can be extended by the bar length of the axial bar. The axial bar can be connected, in a torsionally-resistant manner, to the output-side gear wheel element of the gear speed, while forming the aforementioned movable suspension spring foot point. For example, the output-side gear wheel element can be implemented as a cam, the outer toothing of which engages with the drive-side gear wheel element and is connected, in a torsionally-resistant manner, to the axial bar on its cam tip protruding radially toward the exterior.

In a further design variant, the wheel suspension may only have the second actuator, but not the first actuator, by means of which the suspension spring foot point can be shifted. To this end, the second actuator can be axially shifted by way of a torque support and be connected, in a torsionally-resistant manner, to the axial bar. The torque support can be shifted axially along the stabilizer torsion spring rod by means of the second actuator. With such an axial adjustment of the torque support, the effective spring bar length of the axial bar varies in order to adjust the suspension spring constant.

In a further design variant, preferably both the first actuator and the second actuator are installed in the wheel suspension. With regard to a component-reduced implementation of the suspension spring foot point adjustment and the suspension spring constant adjustment, the following arrangement is preferred: Thus, the output-side gear wheel element (that is, the aforementioned cam with outer toothing) can simultaneously also function as the torque support, which can be axially shifted by means of the second actuator. To this end, the output-side gear wheel element can be mounted rotatably on the outer circumference of the stabilizer torsion spring rod via an annular gear wheel support. The gear wheel support is mounted on the stabilizer torsion spring rod, in an axially adjustable manner, by means of an axial guide, and is simultaneously in threaded engagement with a drive spindle of the second actuator. Thus, upon activation of the second actuator, the annular gear wheel support can be axially shifted, together with the output-side gear wheel element mounted rotatably thereon.

In one technical implementation, the stabilizer torsion spring rod may extend in the vehicle's transverse direction without interruption and/or extend continuously as a single piece. In this case, the stabilizer torsion spring rod may have a suspension spring/torsion spring rod on each side of the vehicle. Preferably, both the stabilizer torsion spring rod and the suspension spring/torsion spring rod can preferably be directly connected to the output lever (for example, through a welded connection), in a manner so as to transfer power.

In one technical implementation, the suspension spring/torsion spring rod may be constructed in two parts from a hollow rod and a solid rod guided coaxially therein. The hollow rod can be attached to the output lever on one end and be guided toward the vehicle interior in the vehicle's transverse direction. The solid rod can be connected at the vehicle-internal end of the hollow rod in a manner so as to transfer power and extend toward the exterior of the vehicle embedded in the vehicle's transverse direction. The vehicle-external end of the torsion spring/solid rod may be connected to the aforementioned coupler in a manner so as to transfer power.

The suspension spring, along with a shock absorber, may be a component of a spring-damper unit of the vehicle. The shock absorber of the vehicle may be, for example, a linear shock absorber or preferably at least a rotational damper, which can be impacted with the compression and rebound movements of the wheel suspension. The rotational damper may have a damper housing, which is formed, in a rotationally-resistant manner, on the vehicle body as well as a rotor mounted so as to pivot around a rotor axis. The rotor (for example implemented as a rotor shaft or rotor ring) may be impacted with the compression and rebound movements of the wheel suspension, for example, via a drive lever. In this case, a damping effect may result between the rotor and the damper housing. An electric rotational damper may preferably be used, in which the rotor shaft interacts with a stator firmly attached to the housing. Depending on the activation of the electric rotational damper, it may function in a damping operating mode, in which compression and rebound movements of the wheel suspension are damped during vehicle operation. Alternatively and/or additionally, the electric rotational damper may function in a generator operating mode, in which the rotational movement introduced into the rotational damper is converted into electrical energy. Alternatively and/or additionally, the rotational damper may influence, in a controlled manner, the twisting movement of the stabilizer torsion spring rod. For example, the rotational damper may counteract a twisting movement of the stabilizer, whereby the spring constant of the stabilizer is increased. On the other hand, when the rotational damper is deactivated, the spring constant of the stabilizer can be reduced, whereby the stabilizer responds more smoothly, which increases driving comfort.

In normal practice, the stabilizer torsion spring rod is mounted so as to pivot in the vehicle's transverse direction, at stabilizer bearings spaced apart from one another on the vehicle body. With respect to a wheel suspension that is beneficial to the packaging space and component-reduced, it is preferable when the respective stabilizer bearing is formed with the assistance of the rotational damper. In this case, the rotational damper acting as the stabilizer bearing, the stabilizer torsion spring rod, and the suspension spring/torsion spring rod form one structural unit within the wheel suspension. With respect to a compact and functional design, it is preferable when the rotational damper is arranged coaxially with respect to the suspension spring/torsion spring rod and particularly in radial alignment thereto.

The advantageous embodiments and/or enhancements of the invention previously explained and/or represented in the dependent claims—except, for example, in cases of clear dependencies or incompatible alternatives—may be used individually or also in any combination with one another.

BRIEF DESCRIPTION OF THE DRAWINGS

The invention and its advantageous embodiments and enhancements as well as the advantages thereof are explained in more detail in the following by means of drawings.

Herein.

DETAILED DESCRIPTION OF THE DRAWINGS

Figure 1:
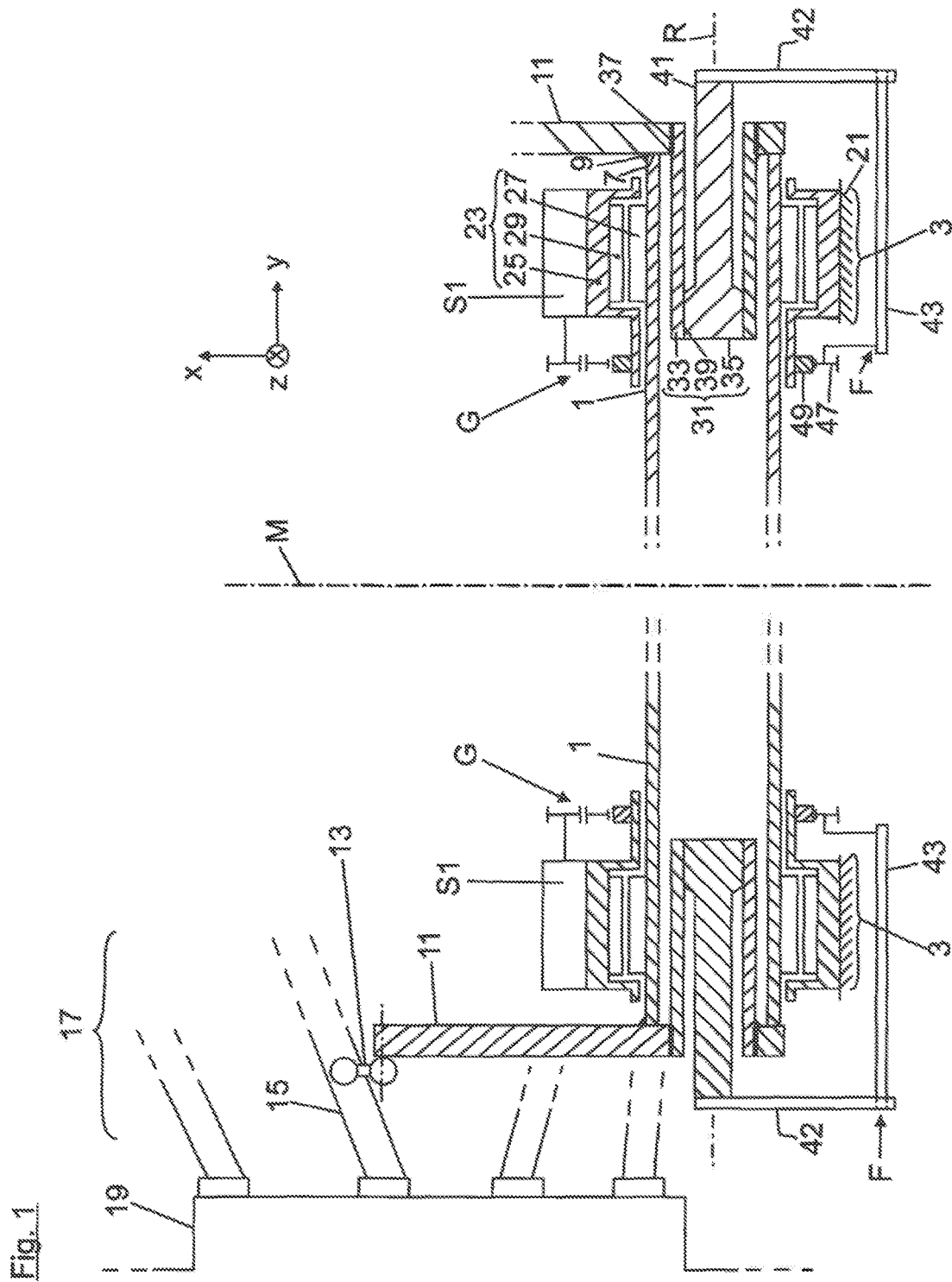
FIG. 1 shows, in a schematic partial sectional representation, a wheel suspension of a vehicle axle with stabilizer of a two-track vehicle.
Figure 2:
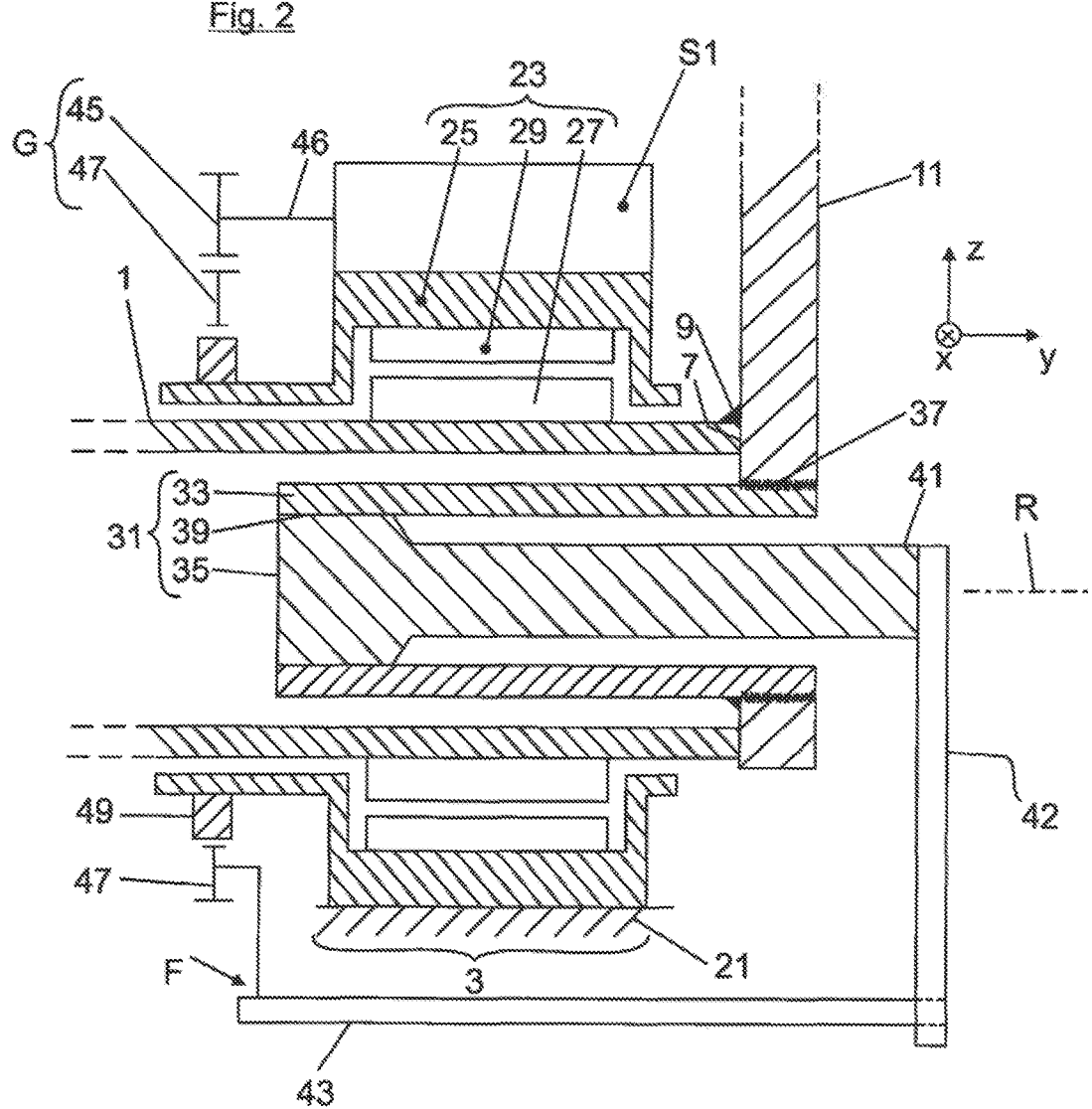
FIG. 2 shows an enlarged partial sectional representation along a yz-sectional plane through the stabilizer according to a first exemplary embodiment.

FIG. 1 shows the wheel suspension at a vehicle axle of a two-track vehicle with a stabilizer 1 and with further vehicle components of the wheel suspension, which are merely roughly schematically indicated. Accordingly, the stabilizer 1 is implemented as a stabilizer torsion spring rod, which extends in the vehicle's transverse direction y without interruption and continuously as a single piece between the two sides of the vehicle. The wheel suspension and the stabilizer torsion spring rod 1 are implemented essentially as mirror images with reference to a vehicle's median longitudinal plane M. Thus, the stabilizer torsion spring rod 1 is routed through a stabilizer bearing 3 toward the exterior of the vehicle on each side of the vehicle and connected to an output lever 11 with each of its front sides external to the vehicle 7 (FIG. 1 or 2) by means of a weld point 9, in a manner so as to transfer power. The output lever 11 is supported in FIG. 1 by way of a coupling rod 13 aligned essentially vertically on a wheel guidance element 15 of the wheel suspension. The coupling rod 13 is in an articulated connection with both the wheel guidance element 15 and with the output lever 11. In FIG. 1, the wheel guidance element 15 is a component of a multi-link unit 17, with which a wheel carrier 19 indicated in FIG. 1, which supports a vehicle wheel, which is not shown, is hinged on the vehicle body 21 (FIG. 1 or 2). In FIG. 2, the wheel suspension is only shown for the left-hand side of the vehicle.

As previously mentioned, the stabilizer torsion spring rod 1 is mounted on the vehicle body 21 so as to pivot by means of a stabilizer bearing 3. The stabilizer bearings 3 are each implemented according to the figures by an electric rotational damper 23, which is constructed from a damper housing 25, which is formed, in a rotationally-resistant manner, on the vehicle body 21 and a rotor 27, which is mounted so as to pivot around a rotor axis R. The rotor ring 27 acts together with a stator 29 firmly attached to the housing in FIG. 1 or 2. The rotor ring 27 in this case is arranged, in a torsionally-resistant manner, on the stabilizer torsion spring rod 1, while the stator 29 is mounted firmly on the damper housing 25.

In FIGS. 1 to 6, the rotational damper 23 forms a spring-damper unit of the vehicle together with a suspension spring 31. In the figures, the suspension spring 31 is formed as a suspension spring/torsion spring rod, which is arranged radially, so as to be beneficial to the packaging space, within the stabilizer torsion spring rod 1 designed as a hollow rod.

As shown in FIG. 1 or 2, the suspension spring/torsion spring rod 31 is constructed in two parts, that is, with a suspension spring hollow rod 33 and a suspension spring solid rod 35 guided coaxially therein. The suspension spring hollow rod 33 is connected to a weld point 37 on the output lever 11, in a manner so as to transfer power, and is routed toward the vehicle interior in the vehicle's transverse direction y in FIG. 1, 2, or 4. The radially inner suspension spring solid rod 35 is connected, in a manner so as to transfer power (for example, by way of a spline, which is not shown) on the vehicle-internal end 39 of the suspension spring hollow rod 33 and extends in the opposite direction toward the exterior of the vehicle in the vehicle's transverse direction y.

In FIGS. 1 and 2, the vehicle-external end 41 of the suspension spring solid rod 35 is connected to an axial bar 43, which extends axis-parallel and with a radial distance with respect to the stabilizer torsion spring rod 1 via a coupler 42 protruding radially toward the outside. The axial bar 43 is designed as a tubular spring element, which has spring properties as compared to the rigid coupler 42. Consequently, the axial bar 43, together with the radially inner suspension spring solid rod 35 and the radially outer suspension spring hollow rod 33, is a component of the suspension spring 31.

In FIG. 1 or 2, the wheel suspension has a first actuator S1, with which a suspension spring foot point adjustment takes place, with which a suspension spring foot point F (FIGS. 1 to 4) is shifted in the circumferential direction. By way of example, the first actuator S1 is an electrically operable actuator, which is mounted radially outside of the stabilizer torsion spring rod 1 and mounted firmly to the damper housing 25 of the rotational damper 23 in FIGS. 1 and 2. The actuator S1 in FIG. 2 is drivingly connected to the axial bar 43 via a gear speed G. To this end, the gear speed G has a drive-side gear wheel element 45 on a drive shaft 46 of the first actuator S1 and an output-side gear wheel element 47 meshing therewith, which is mounted so as to pivot on an annular support 49 on the outer circumference of the stabilizer torsion spring rod 1. According to FIGS. 1 and 2, the output-side gear wheel element 47 is connected to the axial bar 43 in a torsionally resistant manner.

Figure 3:
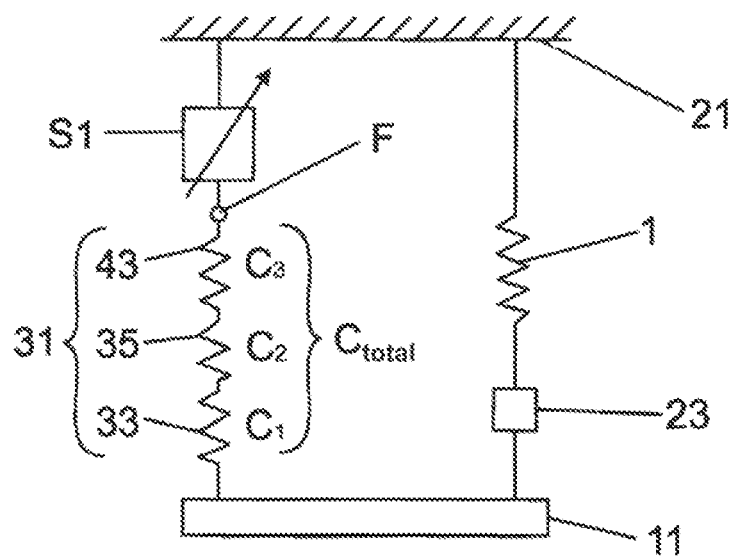
FIG. 3 shows the wheel suspension in an equivalent circuit diagram.

The arrangement shown in FIGS. 1 and 2 is roughly schematically represented as an equivalent circuit diagram in FIG. 3. Consequently, the suspension springs 31 and the stabilizer torsion spring rod 1 are connected in a parallel circuit between the vehicle body 21 and the output lever 11 acting on the wheel guidance element 15. The suspension spring hollow rod 33, the suspension spring solid rod 35, and the axial bar 43 are accordingly arranged in a series circuit and have spring constants $c_1$, $c_2$, and $c_3$, respectively, which are added together to form the total spring constant $c_{tot}$. The axial bar 43 is drivingly connected to the first actuator S1 in FIG. 3 while forming the suspension spring foot point F. When the first actuator S1 is activated, the suspension spring foot point F is shifted in a circumferential direction in order, for example, to undertake a height adjustment of the vehicle body 21.

Figure 4:
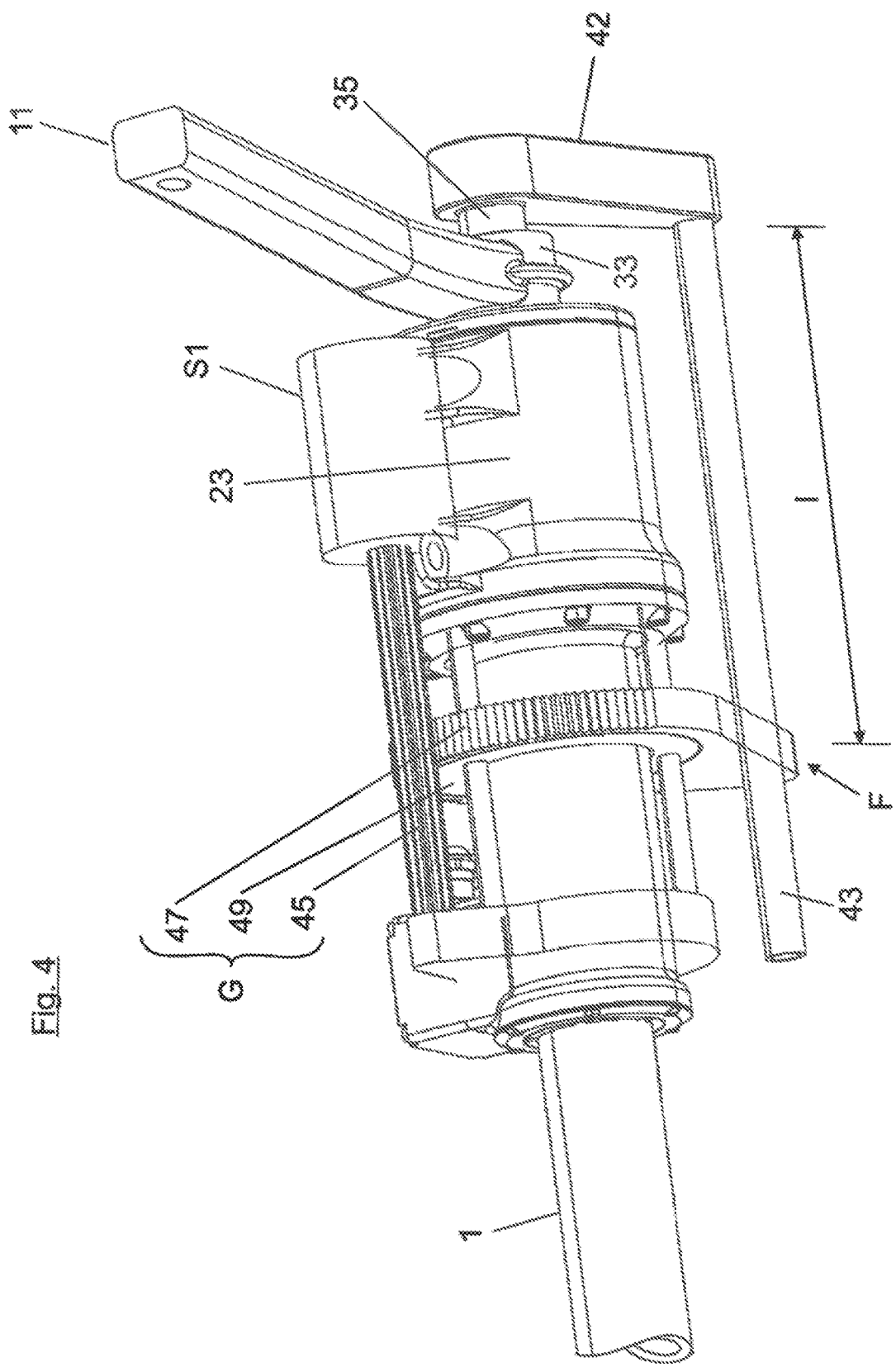
FIG. 4 shows the construction shown in FIG. 2 in a technical implementation.

FIG. 4 shows the arrangement indicated in FIG. 2 in a technical implementation. Accordingly, the drive-side gear wheel element 45 is a spline shaft extending longitudinally along the stabilizer torsion spring rod 1, while the output-side gear wheel element 47 is a cam with outer toothing, which meshes with the spline shaft 45. The cam 47 is connected at the axial bar 43 at its cam tip protruding radially toward the exterior while forming the suspension spring foot point F movable in the circumferential direction. The axial bar 43 has an effective spring bar length l in FIG. 4, which extends between the suspension spring foot point F and the coupler connection.

Figure 5:
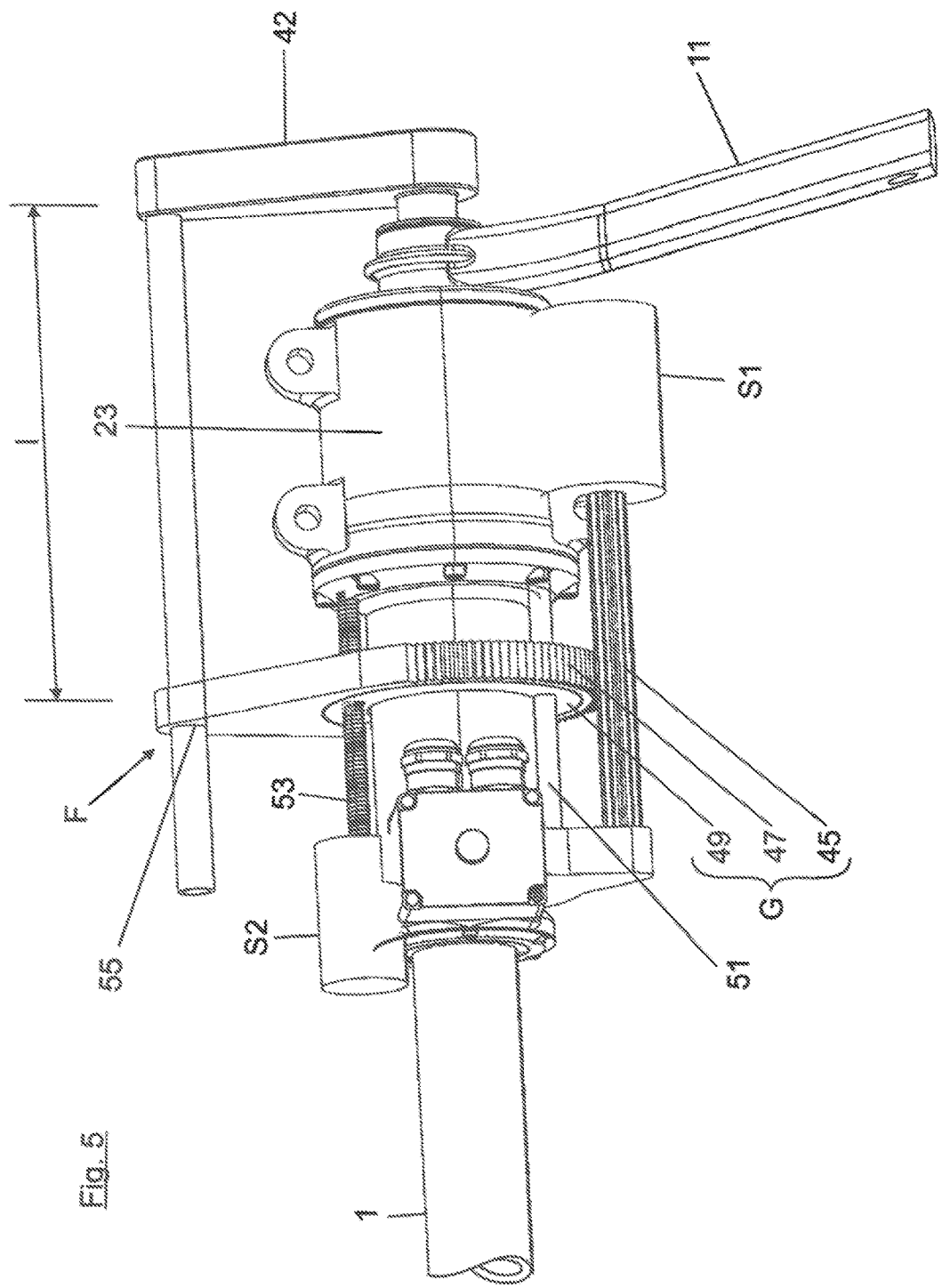
FIGS. 5 and 6 show a second and a third exemplary embodiment in views according to FIG. 4.

FIG. 5 shows the wheel suspension according to a second exemplary embodiment, the basic construction of which is identical to the construction shown in FIG. 4. In addition to FIG. 4, a second actuator S2 is installed in the wheel suspension in FIG. 5. By means of the second actuator S2, the previously described effective spring bar length l of the axial bar 43 can be modified in order to vary the axial bar spring constant $c_3$ (FIG. 3). In this manner, the suspension spring hardness/softness and thus the total spring constant $c_{total}$ of the suspension spring 31 can be adjusted.

In order to implement the modified total spring constant $c_{total}$, the cam support 49 in FIG. 5—contrary to FIG. 4—is no longer mounted in a fixed position on the outer circumference of the stabilizer torsion spring rod 1 in the axial direction, but rather is mounted to be axially adjustable via an axial guide 51. In addition, the cam support 49 is in threaded engagement with a drive spindle 53 of the second actuator S2. Upon activation of the second actuator S2, the annular cam support 49 can be axially shifted, together with the cam 47 mounted so as to pivot thereupon, whereby the axial position of the suspension spring foot point F and thus the effective spring bar length l changes. In this manner, both the suspension spring hardness and the spring foot point F in FIG. 5 can be adjusted. In order to ensure a smooth axial adjustment, the axial bar 43 is mounted so as to move axially in a bearing eye 55 at the cam tip of the cam 47.

Figure 6:
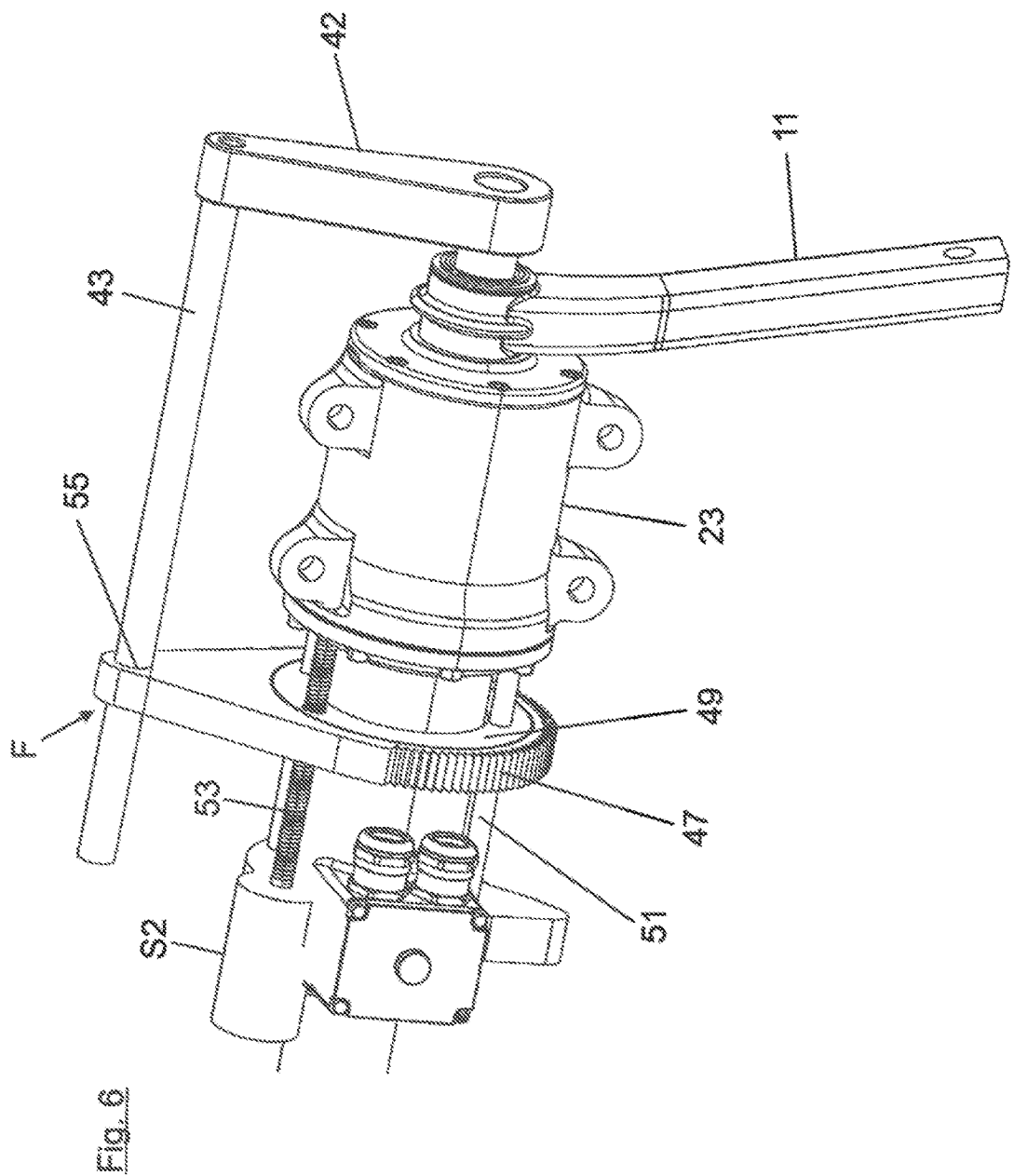

FIG. 6 shows the wheel suspension according to another exemplary embodiment, in which the first actuator S1 for the spring foot point adjustment has been omitted and only the second actuator S2 is installed for adjusting the suspension spring constant $c_{total}$. Accordingly, the cam support 49 can be shifted axially by means of the second actuator S2 in order to adjust the suspension spring constant $c_{total}$. However, the cam 47 in FIG. 6 is connected, in a torsionally-resistant manner, to the stabilizer torsion spring rod 1 in the circumferential direction, so that no spring foot point adjustment can be undertaken.

In FIGS. 1 to 6, the rotational damper 23 is an electrically operable actuator. For example, the actuator can function as in the previously mentioned DE 10 2006 009 524 A1. Upon activation of the actuator, a torsion of the stabilizer torsion spring rod is inhibited or blocked, while the torsion of the stabilizer torsion spring rod is released when the actuator is deactivated, whereby a smoother spring rate of the stabilizer torsion spring rod can be produced.

The invention claimed is:

1. A wheel suspension for a two-track vehicle, comprising:
at least one stabilizer formed as a stabilizer torsion spring rod, with the stabilizer extending in the vehicle's transverse direction and having a drive lever on at least one side of the vehicle, which acts upon a wheel guidance element of the wheel suspension, and having at least one suspension spring, which is tensioned with a spring preload between the vehicle body and a wheel guidance element of the wheel suspension, wherein the suspension spring is at least partially formed as a suspension spring/torsion spring rod, wherein the suspension spring/torsion spring rod is arranged radially within the stabilizer torsion spring rod formed as a hollow rod, wherein a first actuator for extending a suspension spring foot point, for regulating a vehicle level of the vehicle body, and a second actuator for adjusting a suspension spring constant is allocated to the suspension spring.

2. The wheel suspension according to claim 1, wherein the first or second actuator is radially arranged, affixed to the body, outside of the stabilizer torsion spring rod, and in that particularly the first actuator is connected to the suspension spring torsion spring rod arranged radially within the stabilizer torsion spring rod by way of a gear speed.

3. The wheel suspension according to claim 1, wherein, in order to connect the suspension spring/torsion spring rod to the first and/or second actuator, a power transfer path is provided, in which an external end of the suspension spring/torsion spring rod, protruding axially over the stabilizer torsion spring rod is connected to an axial bar, which extends essentially axis-parallel and at a radial distance with respect to the stabilizer torsion spring rod, via a coupler protruding outward radially, wherein the first and second actuator engages at the axial bar.

4. The wheel suspension according to claim 3, wherein the gear speed has a gear wheel element arranged, in a torsionally resistant manner, on a drive shaft of the first actuator and an output-side gear wheel element meshing therewith, wherein the gear wheel element is mounted coaxially and rotatably with respect to the stabilizer torsion spring rod on its outer circumference and is connected to the axial bar in a torsionally resistant manner, so that, upon activation of the first actuator, the suspension spring foot point can be shifted in a circumferential direction in order to adjust the height of the vehicle body.

5. The wheel suspension according to claim 3, wherein the axial bar is a spring element, wherein the effective spring length of the suspension spring is extended by the bar length of the axial bar, and the axial bar is connected to the output-side gear wheel element, in a torsionally resistant manner, with the formation of the suspension spring foot point.

6. The wheel suspension according to claim 5, wherein the axial bar is connected to a torque support arranged in a torsionally resistant manner, with formation of the suspension spring foot point, wherein the torque support can be axially shifted by means of the second actuator, wherein the torque support can be axially shifted by the second actuator, so that, upon an axial shift of the torque support, the effective spring bar length of the axial bar can be adjusted in order to adjust the suspension spring constant.

7. The wheel suspension according to claim 6, wherein both the first actuator and the second actuator are installed in the wheel suspension, wherein the output-side gear wheel element functions as the torque support and can be axially shifted by the second actuator.

8. The wheel suspension according to claim 7, wherein the output-side gear wheel element is mounted rotatably on the outer circumference of the stabilizer torsion spring rod by way of an annular gear wheel support, wherein the gear wheel support is in threaded engagement with a drive spindle of the second actuator, so that, upon activation of the second actuator, the annular gear wheel support is axially shifted, along with the output-side gear wheel element mounted rotatably thereupon.

9. The wheel suspension according to claim 1, wherein the suspension spring is a component of a spring-damper unit of the vehicle, and namely together with at least one rotational damper, which can be impacted with compression and rebound movements.

10. The wheel suspension according to claim 9, wherein the rotational damper has a damper housing, which is formed in a rotationally resistant manner, on the vehicle body and a rotor, which is mounted so as to pivot therein around a rotor axis and which can be driven with the compression and rebound movements of the wheel suspension, wherein the damper effect occurs between the rotor and the damper housing, wherein the rotational damper is an electric rotational damper, in which the rotor interacts with a stator firmly attached to the housing.

11. The wheel suspension according to claim 10, wherein the stabilizer torsion spring rod is mounted on at least one body-side stabilizer bearing so as to pivot, wherein the stabilizer bearing is implemented by the rotational damper, wherein the rotor of the rotational damper is implemented as a rotor ring, which is arranged, in a torsionally resistant manner, on the stabilizer torsion spring rod.

12. The wheel suspension according to claim 11, wherein the rotational damper is arranged coaxially with respect to the suspension spring torsion spring rod and in radial alignment thereto.

13. The wheel suspension according to claim 1, wherein the stabilizer torsion spring rod extends in the vehicle's transverse direction without interruption and/or continuously as a single piece, wherein the stabilizer torsion spring rod has a suspension spring/torsion spring rod on each side of the vehicle.

14. The wheel suspension according to claim 1, wherein both the stabilizer torsion spring rod and the suspension spring/torsion spring rod are connected to the output lever in a manner so as to transfer power.

* * * * *